(12) United States Patent
Watanabe et al.

(10) Patent No.: US 8,916,844 B2
(45) Date of Patent: Dec. 23, 2014

(54) CONTAINER APPARATUS

(75) Inventors: Tetsuo Watanabe, Utsunomiya (JP);
Hidetomo Suwa, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 277 days.

(21) Appl. No.: 13/512,089

(22) PCT Filed: Nov. 24, 2010

(86) PCT No.: PCT/JP2010/006845
§ 371 (c)(1),
(2), (4) Date: May 25, 2012

(87) PCT Pub. No.: WO2011/064987
PCT Pub. Date: Jun. 3, 2011

(65) Prior Publication Data
US 2012/0280601 A1 Nov. 8, 2012

(30) Foreign Application Priority Data
Nov. 27, 2009 (JP) .................................. 2009-270094

(51) Int. Cl.
*G03C 5/16* (2006.01)
*G03B 42/04* (2006.01)

(52) U.S. Cl.
CPC ..................................... *G03B 42/04* (2013.01)
USPC ........................................................ 250/581

(58) Field of Classification Search
CPC ........ G02B 42/02; G02B 42/04; G03B 42/04; A61B 6/105
USPC ........ 250/581, 580, 370.01–370.15; 378/98.8
See application file for complete search history.

(56) References Cited

U.S. PATENT DOCUMENTS

| | | | |
|---|---|---|---|
| 5,773,839 A | 6/1998 | Krepel et al. | |
| 5,804,832 A * | 9/1998 | Crowell et al. | 250/580 |
| 6,344,652 B1 * | 2/2002 | Shoji | 250/370.09 |
| 6,940,078 B2 * | 9/2005 | Yasuda et al. | 250/484.4 |
| 7,202,481 B2 * | 4/2007 | Spahn et al. | 250/370.09 |
| 7,429,737 B2 * | 9/2008 | Wojcik et al. | 250/370.09 |
| 2003/0047696 A1 | 3/2003 | Brahm | |
| 2006/0071172 A1 * | 4/2006 | Ertel et al. | 250/370.11 |

(Continued)

FOREIGN PATENT DOCUMENTS

| | | |
|---|---|---|
| CN | 1503053 A | 6/2004 |
| EP | 632320 A1 | 1/1995 |

(Continued)

OTHER PUBLICATIONS

"Digital X-ray radiographic flat panel detector", 1998.

*Primary Examiner* — Kiho Kim
(74) *Attorney, Agent, or Firm* — Canon USA Inc. IP Division (57) ABSTRACT

A container apparatus that is able to contain a radiographic imaging apparatus having a rectangular parallelepiped shape. The container apparatus includes a container portion into which the radiographic imaging apparatus is insertable in a direction perpendicular to a radiation detecting surface of the radiographic imaging apparatus and a protecting member that covers side surfaces of the radiographic imaging apparatus contained in the container portion, the side surfaces of the radiographic imaging apparatus being adjacent to the radiation detecting surface. The container apparatus also includes a holding portion that engages with the radiographic imaging apparatus contained in the container portion in order to hold the radiographic imaging apparatus in the container portion.

11 Claims, 7 Drawing Sheets

(56) References Cited

U.S. PATENT DOCUMENTS

| | | |
|---|---|---|
| 2006/0102859 A1 | 5/2006 | Watanabe |
| 2006/0157658 A1* | 7/2006 | Watanabe ............... 250/580 |
| 2009/0122959 A1* | 5/2009 | Jadrich et al. ............. 378/91 |

FOREIGN PATENT DOCUMENTS

| | | |
|---|---|---|
| EP | 2229889 A1 | 9/2010 |
| FR | 2914433 A1 | 10/2008 |
| JP | 5883840 A | 5/1983 |
| JP | 03082333 U | 8/1991 |
| JP | 10282598 A | 10/1998 |
| JP | 2003185756 A * | 7/2003 |
| JP | 2005258370 A | 9/2005 |
| JP | 2009053661 A | 3/2009 |
| JP | 2009186908 A | 8/2009 |
| WO | 2007139638 A2 | 12/2007 |

* cited by examiner

CONTAINER APPARATUS

TECHNICAL FIELD

The present invention relates to a container apparatus that contains a radiographic imaging apparatus.

BACKGROUND ART

To date in general, radiographic imaging apparatuses that detect radiation rays radiated to and transmitted through objects are widely used. Such image taking has generally been performed with the film-screen method or the computed radiography (CR) method. In either of the above methods, a container case, which is standardized as a cassette, is used in taking an image. The container case contains a photographic sensitive film or a phosphor plate that stores an image as a latent image.

Recently, a digital radiography (DR) method, in which a radiographic image is taken and digitized using semiconductor sensors, has also been developed. This method has been in practical use in portable radiographic imaging apparatuses. However, since the radiographic imaging apparatus using the DR method includes a number of electronic components therein, the DR method radiographic imaging apparatus is heavy compared to a related art radiographic imaging apparatus using the cassette method despite efforts that have been made to make the DR method radiographic imaging apparatus lighter.

PTL 1 discloses a cassette carrier into which a radiographic imaging apparatus is inserted in a direction parallel to a radiation detecting surface.

The radiographic imaging apparatus is inserted into the cassette carrier disclosed in PTL 1 in the direction parallel to the radiation detecting surface. Since such a cassette carrier is constructed so as to cover the radiation detecting surface of the radiographic imaging apparatus, the cassette carrier becomes heavy in weight and portability thereof is reduced.

Also in this cassette carrier, since a side surface adjacent to the radiation detecting surface is narrow in width, there is a possibility that the radiographic imaging apparatus is damaged when it is subject to external shock. The cassette carrier having an exposed side surface does not sufficiently protect the radiation detecting surface against external shock.

CITATION LIST

Patent Literature

PTL 1: Japanese Patent Laid-Open No. 10-282598

SUMMARY OF INVENTION

The present invention has been made in consideration of the above situation, and has as its object to eliminate the above problems and ensure both portability and rigidity of the radiographic imaging apparatus.

According to the present invention, the foregoing object is attained by providing a container apparatus that is able to contain a radiographic imaging apparatus having a rectangular parallelepiped shape. The container apparatus includes a container portion into which the radiographic imaging apparatus is insertable in a direction perpendicular to a radiation detecting surface of the radiographic imaging apparatus and a protecting member that covers side surfaces of the radiographic imaging apparatus contained in the container portion, the side surfaces of the radiographic imaging apparatus being adjacent to the radiation detecting surface. The container apparatus also includes a holding portion that engages with the radiographic imaging apparatus contained in the container portion in order to hold the radiographic imaging apparatus in the container portion.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

DESCRIPTION OF EMBODIMENTS

Preferred embodiments of the present invention will be described in detail in accordance with the accompanying drawings.

First Embodiment

A radiographic imaging apparatus in a first embodiment will be described with reference to FIG. 1.

Figure 1:
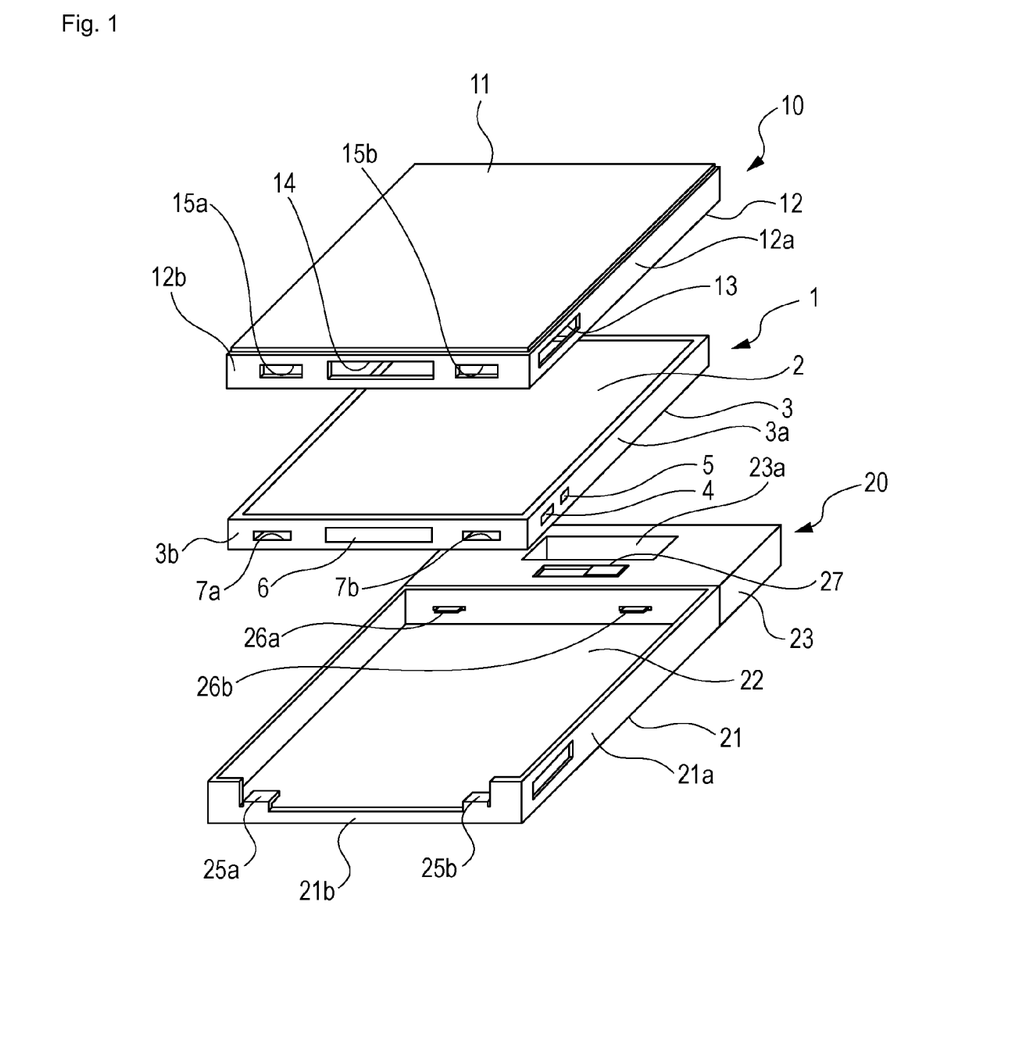
FIG. 1 is a schematic diagram illustrating a general configuration of a radiographic imaging apparatus in a first embodiment.

FIG. 1 illustrates three units that constitute the present embodiment. The radiographic imaging apparatus 1 has a rectangular parallelepiped shape similar to a cassette and includes a radiation detector, wireless circuitry, and a battery, which are not shown, inside a cover 2 provided on a radiation incidence surface side and a housing 3 of the radiographic imaging apparatus 1.

A manipulating portion 4, which includes functions such as those of a power switch and a status display 5 for displaying a state of the radiographic imaging apparatus 1, is provided in a side surface 3a, which is one of side surfaces of the housing 3 and perpendicular to a surface of the cover 2. A wireless communication path 6, which is formed of a resin or other material having a radio transmissive property for wireless communication, is formed in a side surface 3b, which is another side surface of the housing 3. A grid portion 10 is formed so as to cover the radiographic imaging apparatus 1 from the radiation incidence surface side.

The grid portion 10 includes a grid body 11 for eliminating scattered radiation and a frame member 12. The frame member 12 is attached onto a rear surface side of a radiation incidence surface of the grid body 11. The frame member 12 includes openings 13 and 14 formed in side surfaces 12a and 12b thereof at positions corresponding to those of the manipulating portion 4, the status display 5, and the wireless communication path 6 provided on the side surfaces of the radiographic imaging apparatus 1.

A handle portion 20 is provided as a removable unit externally to the radiographic imaging apparatus 1 in order to provide portability to the radiographic imaging apparatus 1. The handle portion 20 includes a depression structure formed by connecting a frame 21 that covers the side periphery of the radiographic imaging apparatus 1 to a rear panel 22 provided on a rear surface side opposite the radiation incidence surface of the radiographic imaging apparatus 1. The handle portion 20 functions as a container apparatus provided with a container portion that can contain the radiographic imaging apparatus 1. The radiographic imaging apparatus 1 can be inserted into the container portion of the handle portion 20 in a direction perpendicular to a radiation detecting surface of the radiographic imaging apparatus 1. The handle portion 20 also functions as a protecting member that protects side surfaces of the radiographic imaging apparatus 1 which are adjacent to the radiation detecting surface.

Figure 2:
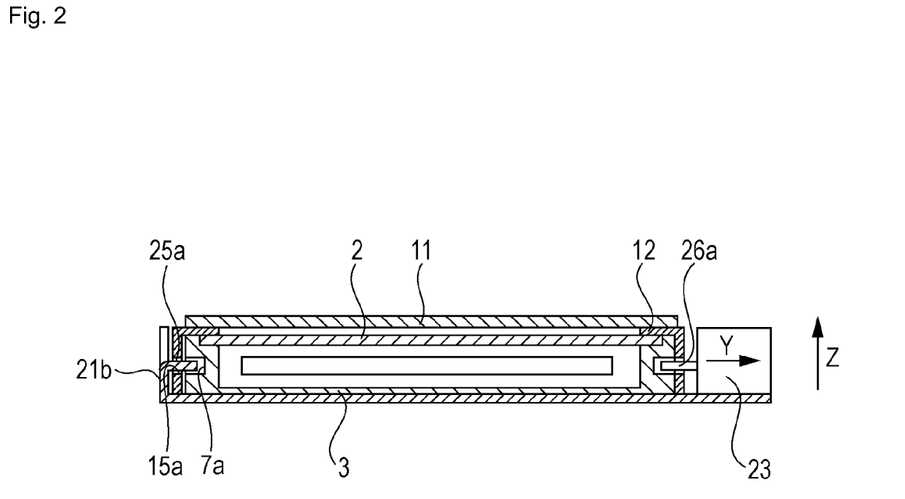
FIG. 2 is a side sectional view of the radiographic imaging apparatus in the first embodiment.

The handle portion 20 is provided with a grip portion 23 for manipulation, which is secured therealong. The grip portion 23 has a through hole 23a formed therein to be of a shape that permits an operator to grip the grip portion 23. As illustrated in FIG. 2, the frame 21 is formed to be of a size sufficient to contain the radiographic imaging apparatus 1 with the grid portion 10 attached thereto. The frame 21 includes protrusions 25a and 25b formed on a side surface 21b side thereof. Grooves 7a and 7b are provided in the side surface 3b of the radiographic imaging apparatus 1, and holes 15a and 15b are provided in the grid portion 10 so as to correspond to the protrusions 25a and 25b. The protrusions 25a and 25b respectively penetrate through the holes 15a and 15b of the grid portion 10 and are inserted into the grooves 7a and 7b of the radiographic imaging apparatus 1. This prevents the radiographic imaging apparatus 1 from moving out the frame 21 in a Z-direction in FIG. 2. In contrast, the frame 21 includes protrusions 26a and 26b for locking formed in a side surface opposite the side surface 21b. The protrusions 26a and 26b function as holding portions and are movable in a Y-direction. The protrusions 26a and 26b are disposed in the grip portion 23 and are movable using a slide portion 27 for manipulation. Initially, the radiographic imaging apparatus 1 and the grid portion 10 are inserted into the handle portion 20 from the same side as that at which the protrusions 25a and 25b are located. The radiographic imaging apparatus 1 and the grid portion 10 are inclined and further inserted into the handle portion 20, and finally are locked by insertion of the protrusions 26a and 26b thereinto.

Such a structure can improve mechanical strength by covering the periphery of the radiographic imaging apparatus 1 with the grid portion 10 and the handle portion 20. This is advantageous in protecting the expensive radiographic imaging apparatus 1 since there is a possibility that the radiographic imaging apparatus 1 may be dropped or struck while it is being transported. In particular, when an image is being taken during a ward round or the like in a hospital, sometimes the radiographic imaging apparatus 1 located under an examinee lying in bed is moved into and out of position. In such a case, even if a load is applied in the Z-direction as illustrated in FIG. 2, this structure can sufficiently withstand the load because of the rear panel 22 disposed on the rear surface side. To suppress damage to the functions and performance of the status display 5, the manipulating portion 4, and the wireless communication path 6 provided in the radiographic imaging apparatus 1, such damage being caused by covering the periphery of the radiographic imaging apparatus 1, openings corresponding to those portions are provided. In addition, by providing a locking mechanism on the grip portion 23 side of the handle portion 20, the distances between an image taking area of the radiographic imaging apparatus 1 and the outer shape of the handle portion 20 can be minimized at the other three side surfaces of the handle portion 20. As described above, the locking mechanism functions as a controlling portion that controls engagement of the holding portions. This permits image taking with the three sides moved close to a desired region.

Second Embodiment

Figure 3:
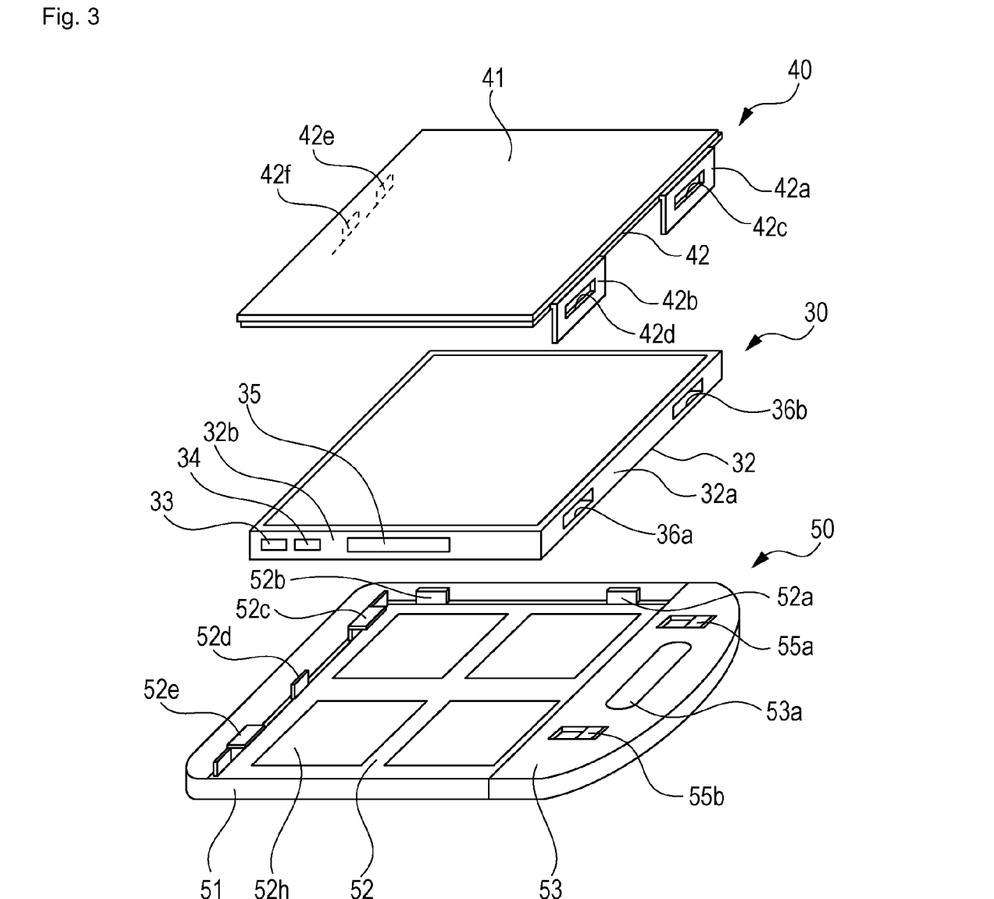
FIG. 3 is a schematic diagram illustrating a general configuration of a radiographic imaging apparatus in a second embodiment.

A second embodiment will be described with reference to FIGS. 3 to 7. FIG. 3 illustrates three units that constitute the present embodiment. Reference numeral 30 denotes a radiographic imaging apparatus, which includes a radiation detector inside a housing that is formed to have a standard size of a cassette as in the case with the first embodiment. Unlike the first embodiment, a manipulating portion 33, a status display 34, and a wireless communication path 35 are disposed together on a side surface 32b, which is one of side surfaces of the housing. In addition, grooves 36a and 36b used to secure the radiographic imaging apparatus 30 to a handle portion 50 are provided on a side surface 32a, which is perpendicular to the side surface 32b.

Figure 4:
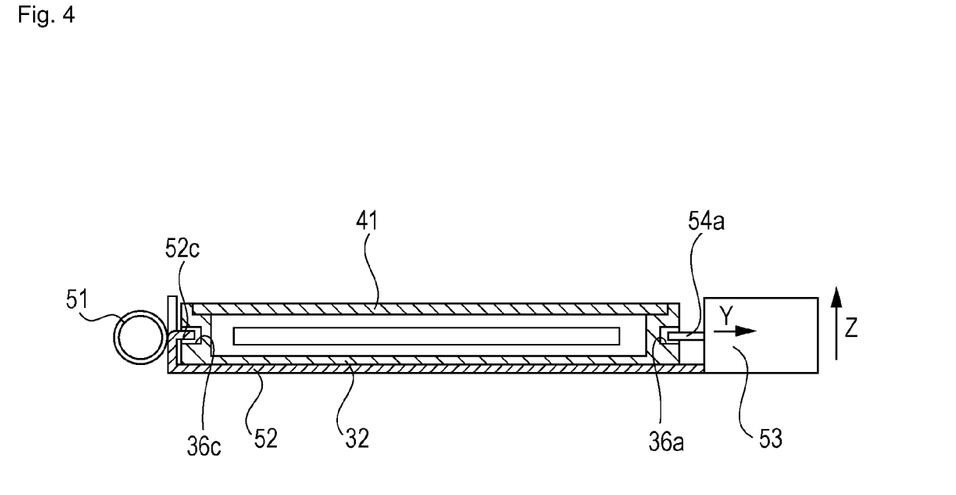
FIG. 4 is a side sectional view illustrating the radiographic imaging apparatus of the second embodiment.

The handle portion 50 includes a frame 51 formed of a pipe material so as to cover a side periphery of the radiographic imaging apparatus 30, a rear panel 52 provided on a rear surface side of a radiation incidence surface of the radiographic imaging apparatus 30, and a grip portion 53 having a through hole 53a. By using the pipe material, a buffering effect, which makes lateral shock be less transmittable to the radiographic imaging apparatus 30, can be achieved. The buffering effect can be further improved by filling a material having a good buffering property in the hollow portion of the pipe and by coating the surface of the pipe with a material having a good buffering property. The rear panel 52 is secured to the frame 51 at bent protrusions such as protrusions 52a to 52e. By connecting the frame 51 to the rear panel 52, mechanical strength against distortion, bending, and so forth is improved. Out of the protrusions of the frame 51, as illustrated in FIG. 4, top portions of the protrusions 52c and 52e are bent so as to be inserted into a groove 36c provided in the radiographic imaging apparatus 30 when the handle portion 50 is attached to the radiographic imaging apparatus 30.

Figure 5:
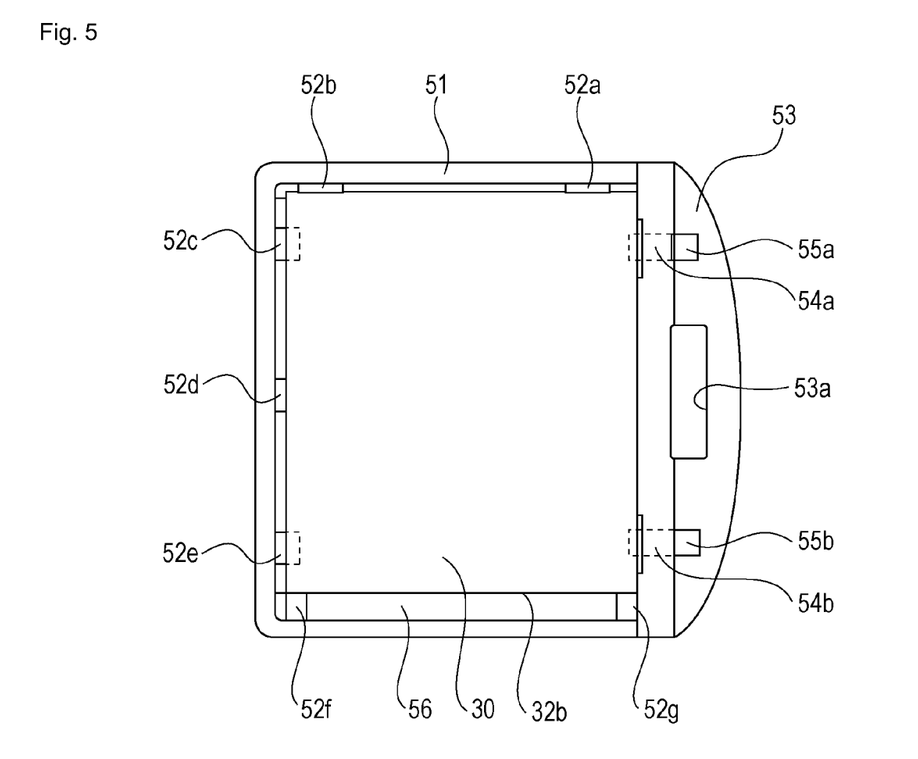
FIG. 5 is a front view illustrating the radiographic imaging apparatus in the second embodiment.
Figure 6:
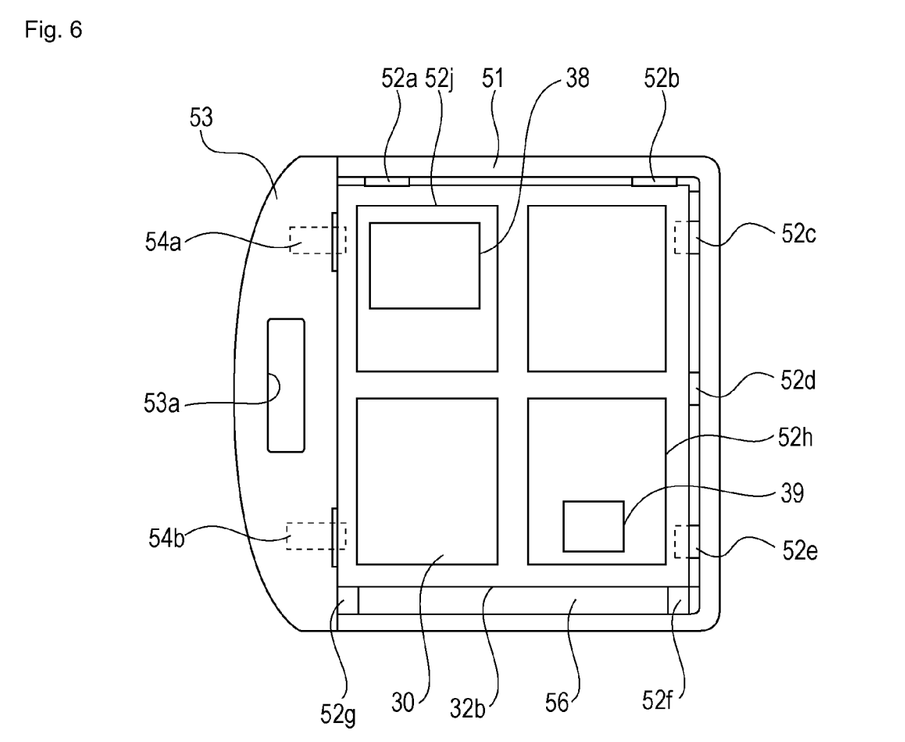
FIG. 6 is a back view illustrating the radiographic imaging apparatus in the second embodiment.

Protrusions 54a and 54b movable in the Y-direction are inserted into the grooves 36b and 36a provided in the opposing side surface in order to secure the radiographic imaging apparatus 30 so as to prevent the radiographic imaging apparatus 30 from moving out of the frame 51 in the Z-direction. The grip portion 53 includes the protrusions 54a and 54b for locking disposed therein. The protrusions 54a and 54b for locking are movable with slide portions 55a and 55b for manipulation provided on the surface side of the grip portion 53. This state, in which only the radiographic imaging apparatus 30 is attached to the handle portion 50, is illustrated in FIG. 5 as seen from the radiation incidence surface side and in FIG. 6 as seen from the rear surface side. The radiographic imaging apparatus 30 is unevenly arranged in a receiving space formed by the frame 51 and the grip portion 53 so as to form a space 56 on the side surface 32b side where the manipulating portion 33, the status display 34, and the wireless communication path 35 are arranged. This structure, by uniformly covering the periphery of the radiographic imaging apparatus 30 without any cutout portions, protects the radiographic imaging apparatus 30 against lateral shock. This structure can also ensure a space to allow access to the manipulating portion 33, a space to facilitate a visual check of the status display, and a space unlikely to interfere with radio communication. By arranging those components and the space on one side surface side, the distances between the image taking area of the radiographic imaging apparatus 30 and the outer shape of the handle portion 50 can be minimized at one of the short sides and at one of the long sides. Thus, it is unlikely that image taking is obstructed. The radiographic imaging apparatus 30 includes a battery 38 and a second wireless communication path 39 on the rear surface side. The handle portion 50 has a plurality of openings including openings 52h and 52j formed in the rear panel 52. For example, a door portion is formed in the bottom of the depression of the handle portion 50. The door portion permits the battery 38 to be removably attached to the handle portion 50. An opening for performing wireless communication is also formed.

This can facilitate attaching of the battery 38, ensure wireless communication paths 39, and achieve the lightweight handle portion 50. In addition, since this structure permits the rear surface of the radiographic imaging apparatus 30 to be directly exposed, there is no degradation of heat dissipation performance of the radiographic imaging apparatus 30.

Figure 7:
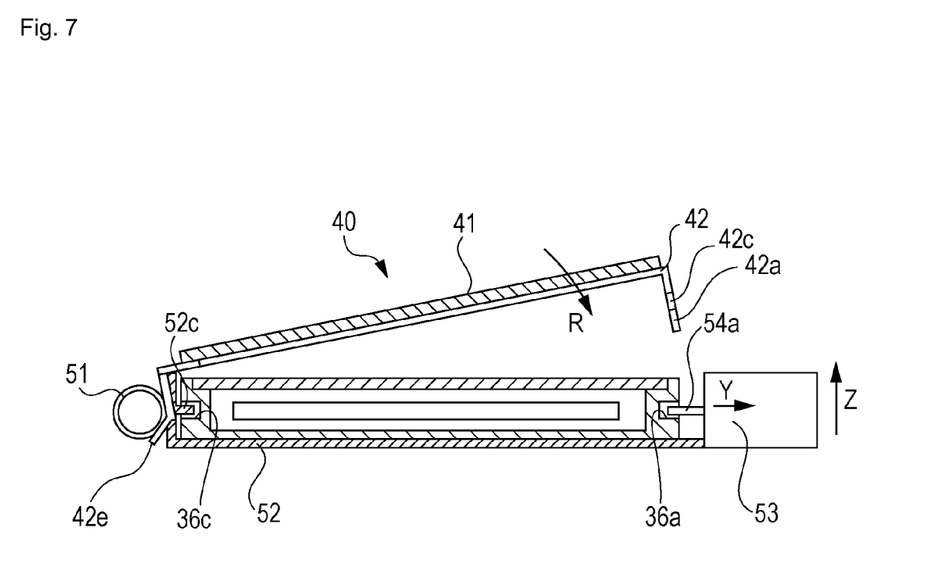
FIG. 7 is a schematic diagram describing how a grid portion is attached in the second embodiment.

As illustrated in FIG. 3, a grid portion 40 includes a frame 42 attached to a rear surface side of a grid body 41. The frame 42 is provided with protrusions 42a, 42b, 42e, and 42f. Since the frame 42 is provided closer to the rear surface side than the grid is, edges of the frame 42 do not directly contact an examinee. Engaging holes 42c and 42d are formed in the protrusions 42a and 42b so as to face the grooves 36b and 36a of the radiographic imaging apparatus 30. The protrusions 42e and 42f, which are provided at the opposite side of the frame 42, have a shape where tops of the protrusions 42e and 42f are obtusely bent. The protrusions 42e and 42f are, as illustrated in FIG. 7, inserted into the frame 51 at positions between the protrusions 52c and 52e of the handle portion 50 so as to be hooked to the frame 51. The grid portion 40 is inclined in the direction indicated by the arrow R in the figure so as to align the protrusions 42a and 42b with the grooves 36b and 36a of the radiographic imaging apparatus 30. In so doing, the protrusions 54a and 54b for locking are moved so as to be passed through the holes 42c and 42d of the grid portion 40 and the grooves 36b and 36a of the radiographic imaging apparatus 30. As described above, in the present embodiment, a change between states can be easily performed, that is, from a state in which only the radiographic imaging apparatus 30 is attached to the handle portion 50 to another state in which both the radiographic imaging apparatus 30 and the grid portion 40 are attached to the handle portion 50.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-270094, filed Nov. 27, 2009, which is hereby incorporated by reference herein in its entirety.

The invention claimed is:

1. A container apparatus that is able to contain a radiographic imaging apparatus having a rectangular parallelepiped shape, the container apparatus comprising:

a container portion into which the radiographic imaging apparatus is insertable in a direction perpendicular to a radiation detecting surface of the radiographic imaging apparatus;

a protecting member that covers side surfaces of the radiographic imaging apparatus contained in the container portion, the side surfaces of the radiographic imaging apparatus being adjacent to the radiation detecting surface; and a holding portion that has protrusions to be inserted to grooves in the side surfaces of the radiographic imaging apparatus and protrusions for locking being movable with slide portions for manipulation provided on a surface side of a grip portion having a through hole.

2. The container apparatus according to claim 1, further comprising a grid portion configured to be removably attached to the container apparatus and configured to cover the radiation detecting surface of the radiographic imaging apparatus contained in the container portion, wherein, when the grid portion is attached to the container apparatus, the holding portion engages with the radiographic imaging apparatus and with the grid portion in the container portion.

3. The container apparatus according to claim 2, wherein the grid portion has holes for inserting the protrusions of the holding portion.

4. The container apparatus according to claim 1, wherein the protecting member has an opening for manipulating a manipulating portion of the radiographic imaging apparatus contained in the container portion.

5. The container apparatus according to claim 1, wherein the protecting member has an opening for displaying with a display portion of the radiographic imaging apparatus contained in the container portion.

6. The container apparatus according to claim 1, further comprising:

a grip portion that is removably attached to the container portion for transporting the radiographic imaging apparatus contained in the container portion.

7. The container apparatus according to claim 6, further comprising:

a controlling portion provided in the grip portion, the controlling portion controlling the engagement of the holding portion with the radiographic imaging apparatus.

8. The container apparatus according to claim 1, wherein the container portion is formed in a depression that covers the radiographic imaging apparatus contained in the container portion.

9. The container apparatus according to claim 8, wherein an opening for wireless communication of the radiographic imaging apparatus is formed in a bottom portion of the depression of the container portion.

10. The container apparatus according to claim 8, wherein a door portion for removing and attaching a battery of the radiographic imaging apparatus is formed in a bottom portion of the depression of the container portion.

11. A container apparatus that is able to contain a radiographic imaging apparatus having a rectangular parallelepiped shape, the container apparatus comprising:

a container portion into which the radiographic imaging apparatus is insertable in a direction perpendicular to a radiation detecting surface of the radiographic imaging apparatus;

a protecting member that covers side surfaces of the radiographic imaging apparatus contained in the container portion, the side surfaces of the radiographic imaging apparatus being adjacent to the radiation detecting surface; and a holding portion that engages with the radiographic imaging apparatus contained in the container portion in order to hold the radiographic imaging apparatus in the container portion, wherein the protecting member has an opening for manipulating a manipulating portion of the radiographic imaging apparatus contained in the container portion.

* * * * *